Feb. 13, 1951  W. C. ROE  2,541,613
BARREL TRUCK
Filed Dec. 6, 1946  2 Sheets-Sheet 1
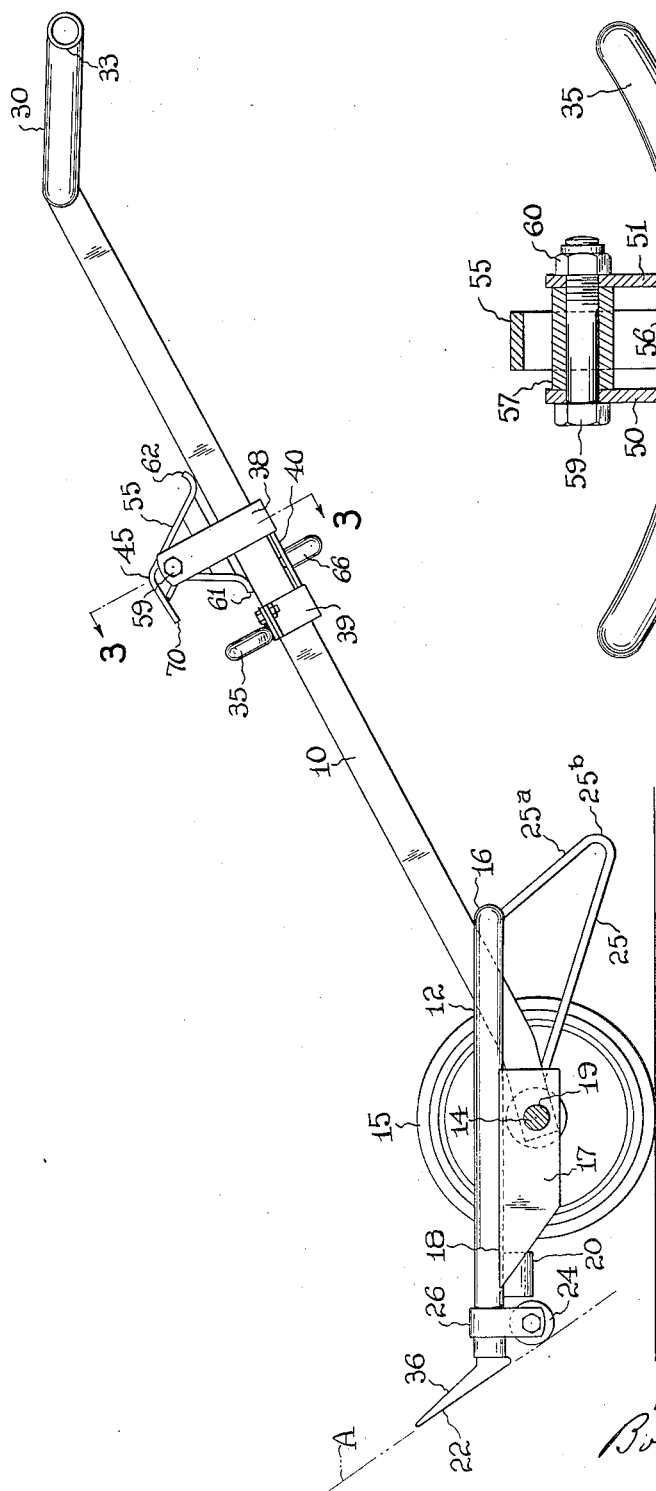
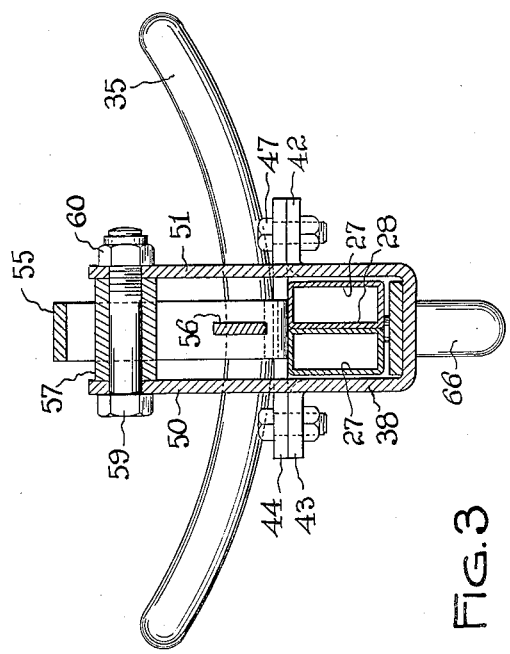
INVENTOR.
WILLIAM C. ROE
BY
Bosworth & Sessions
ATTORNEYS.

Feb. 13, 1951 W. C. ROE 2,541,613
BARREL TRUCK
Filed Dec. 6, 1946 2 Sheets-Sheet 2
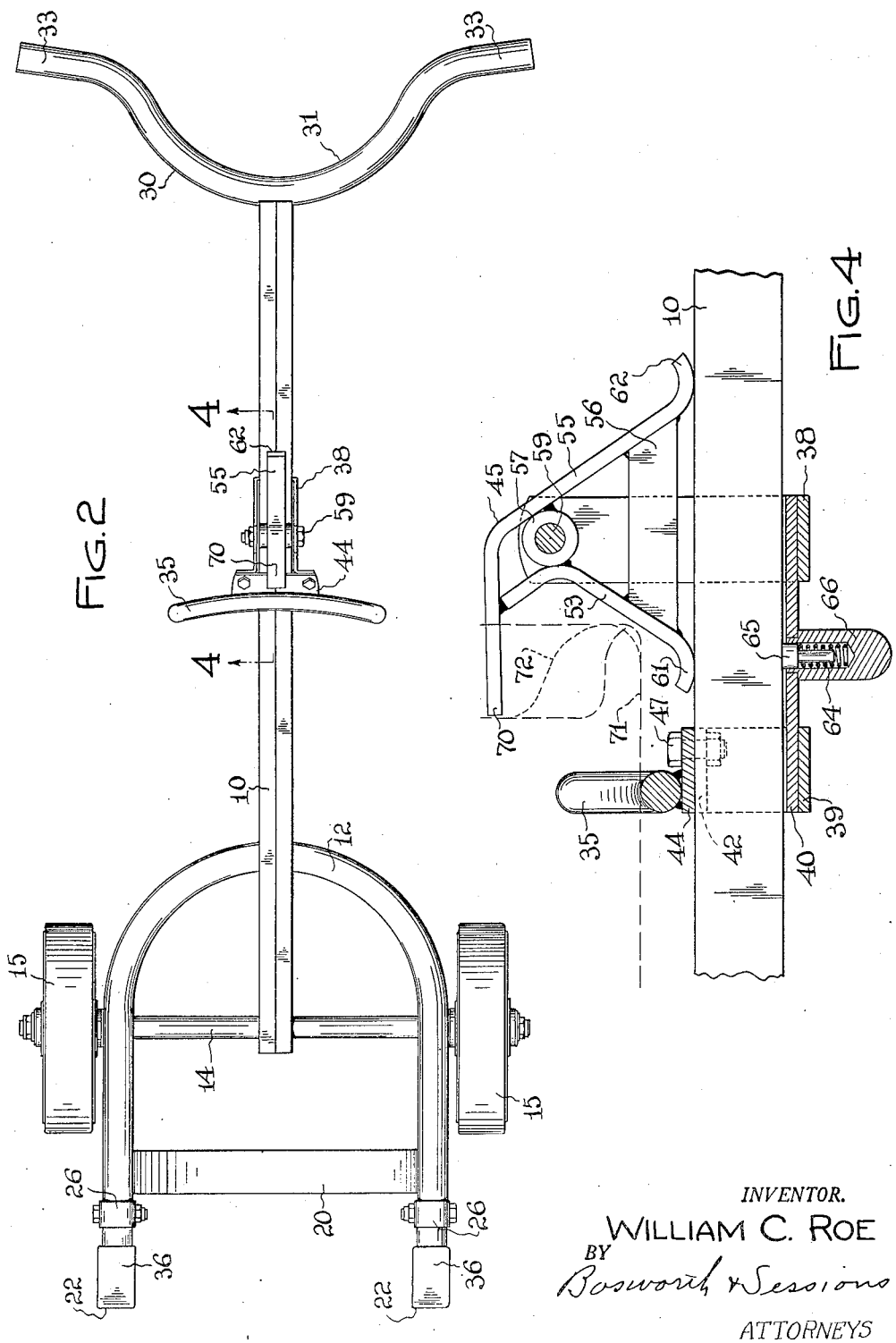
INVENTOR.
WILLIAM C. ROE
BY Bosworth & Sessions
ATTORNEYS Patented Feb. 13, 1951

2,541,613

UNITED STATES PATENT OFFICE 2,541,613

BARREL TRUCK

William C. Roe, Elyria, Ohio, assignor to The Colson Corporation, Elyria, Ohio, a corporation of Ohio Application December 6, 1946, Serial No. 714,552

13 Claims. (Cl. 214—65.4)

This invention relates to load handling mechanisms and more particularly to improvements in hand trucks for transporting containers such as drums and barrels.

To transport a container having the form of a drum, barrel or similar object it is desirable to employ a truck that will engage such a container at or near its bottom and, in cooperation with a hook engaging the top of the container, permit it to be pulled and tipped from a position of rest on the floor to a position where it is supported on the truck when the latter is tilted, after which the truck and its load are rolled to a new location. Unloading the truck involves substantially a reverse order of these operations. Such trucks generally are hand operated and employ a single axle with two principal load carrying wheels. In tilting a container onto such a truck it is desirable to keep the center of gravity of the load as nearly over the axle of the wheels as possible and it also is desirable that the container be loaded onto the truck with a minimum of rocking effort thereby to decrease the effort required of the operator. In the loaded position the container lies across the axle and rests against supports on each side thereof. These supports, in large measure, are braced and carried by a backbone or post that at one end may be pivoted about the load carrying wheels and at the other end terminates in a handle bar by which the operator manipulates the truck.

Barrel trucks of this general type are illustrated in Patent No 2,385,514 issued to Roe C. Hawkins on September 25, 1945. The form of truck there illustrated employs the general combination of a principal pair of wheels on an axle, a backbone secured to the axle and swingable about the axis of the axle and a handle at the free end of the backbone. Toe hooks are provided to be moved into engagement with the bottom of a container and a chime hook is provided on the backbone or post to engage the upper chime of the container wherewith to effect tipping of the drum and control of the load especially during loading and unloading.

It is among the objects of my invention to provide a truck, preferably but not necessarily hand operated, of improved construction and utility over those heretofore known. A further object is to provide such a device with an improved load supporting frame that is more rugged than those of prior similar devices. Another object is to provide an improved frame combination employing a self-locking chime hook that locks to hold a container if it tends to become displaced from the position on the truck in which it is carried. Still a further object of the invention is to provide a reinforced backbone or post of improved construction to carry the load imposed by the wedging action of such a self-locking hook. A still further object is to provide a truck with a bracket slidable along the post and a chime hook that is engaged by the container and pivotally carried by the bracket to be rotated about its axis firmly to lock the bracket and backbone together upon undesired movement of the container. An additional object is to provide a container handling truck in which the chime hook mechanism may be substantially and relatively freely displaced lengthwise of the backbone under the influence of forces acting longitudinally of the backbone but highly resistant to such movement under the influence of forces acting transversely of the backbone. It is also an object of my invention to provide in combination with a hand truck having the features above mentioned a chime hook mechanism that is freely slidable along the backbone to permit the operator to bring it into engagement with the upper chime of a barrel or drum upon initial engagement therewith but that is highly resistant to movement along the backbone while the load is being tilted to or from its position of rest on the floor to insure continuous engagement between the chime hook and the chime of the drum during loading and unloading of the truck even though the chime of the barrel may present such an inclined, sloping or slippery surface as to invite undesirable displacement of the chime hook at such times.

Other objects of the invention and the construction and operation of a preferred form thereof will appear from the following description, reference being had to the accompanying drawings in which Figure 1 is a side elevation of a preferred form of the invention with the closer load wheel removed to show the details of frame construction; Figure 2 is a plan view of the device of Figure 1 with both load wheels in place; and Figures 3 and 4 are enlarged sections through parts of the device as indicated by the lines 3—3 and 4—4 on Figures 1 and 2 respectively.

While the present device is referred to as a barrel truck it will be evident that it may be used for handling loads other than those properly described as drums or barrels. In general the preferred form of barrel truck illustrated herein is a hand operated device in which the load is first engaged with the truck standing in a substantially vertical position after which the truck is rocked to a tilted position to cradle the container in supports on the truck with its center of gravity positioned as nearly as practicable over the axis of the wheels. A handle bar at one end of the truck body is gripped by the operator to manipulate the truck in picking up and discharging a load and in wheeling the truck while transporting a load. The load wheels are supplemented by a pair of rollers positioned between the load wheel axle and the toes that underlie the bottom of a container to lift it and hold it in place against sliding down off the truck when it is tilted. To hold the top of the container in place an assembly that is slidable along the backbone is provided which assembly comprises a barrel support and a shiftable chime hook for engaging inside of the outer rim or chime of a container. This assembly is so constructed that it may easily be shifted along the backbone either by a desired relative longitudinal movement of the container as it drops into place when the truck is tilted or by the operator to engage the container, but the assembly includes a self-locking mechanism by which undesired transverse movement of the container relative to the backbone is prevented and the locking means is rendered effective automatically to lock against a reinforced part of the backbone to prevent such movement.

Referring now to the preferred embodiment of the invention illustrated herein and particularly to Figures 1 and 2 it will be seen that my improved truck comprises a frame built around a backbone 10 and a U-shaped cradle 12. The backbone is formed of two rectangular tubular sections welded together as hereafter described and the cradle is formed of a member of tubular cross section. At one end the backbone is pierced to receive an axle 14 that is welded to it and at the ends of the axle load wheels 15 are rotatably mounted in suitable antifriction bearings. The cradle 12 acts both to support the lower end of a container and to reinforce the frame. The base portion of the U-shaped cradle designated at 16 underlies the backbone 10 and is welded thereto.

The form of construction by which the cradle underlies the backbone greatly improves the strength and rigity of the truck frame as a whole. This is because the downward force of the load carried by the ends of the cradle arms and by the upper portion of the backbone 10 as is hereafter described, tends to rock the backbone clockwise and the cradle counterclockwise about the axle 14. Thus the interposition of the cradle beneath the backbone as shown in the drawings provides a rigid connection in which the full strength of the members themselves prevents any tendency of the frame to separate or spread. This is in direct contrast to preceding constructions in which the load at this point was carried by welds or connecting members rather than by direct load bearing engagement between the main frame members themselves.

The backbone and cradle are secured to the axle 14 to provide with it a rigid and unitary frame assembly. In addition to the manner in which the backbone is welded to the center of the axle as described above each of the arms of the cradle 12 is secured to the axle. This is accomplished by providing two plates 17 as shown in Figure 1, each welded to an adjacent arm of the cradle as indicated at 18 and pierced at 19 to receive the axle 14 to which the plate is welded. The construction thus provided reinforces each of the frame components against deformation under load and maintains the axle in fixed position with respect to the other parts of the frame. The cradle is further reinforced by an arcuate cross slat 20 extending from one arm of the cradle to the other and concave upwardly to support the lower end of a container in a manner hereafter to be described.

Load engaging toes 22 are rigidly secured to the end of each of the cradle arms and are formed as best shown in Figure 1. Their function is to first engage the container or barrel at its lower edge during the break of the load when the truck is forcefully tipped from its initial load engaging generally vertical position wherewith the toes are moved beneath the load. Thus the toes support the load during the time the truck is being tilted from a vertical position to an inclined position as shown in Figure 1 when the container lies against the slat 20 and other parts of the truck hereafter to be described. In this latter position the toes function to prevent a barrel from sliding off the truck while it is being transported to a new location.

In order to facilitate engagement of the toes 22 with a barrel to be picked up rollers or auxilliary wheels 24 are provided. Such rollers are rotatably carried in strip-like brackets 26 secured, preferably welded, near the end of each of the cradle arms as shown in Figure 1. The periphery of each roller is preferably so located that a portion of its surface lies substantially tangent to an extension of the underside of the adjacent toe 22 as indicated by the line A in Figure 1. This line corresponds to the floor line when the truck is substantially upright and the toes are being moved beneath a barrel or when a barrel is being removed from the toes. Thus the plane A is substantially normal to the longitudinal axis of the backbone 10.

From the description thus far it will be evident that the truck may be rocked from a substantially vertical to a tilted position by first pivoting it about the axis of the rollers 24 until the wheels 15 come into contact with the floor after which the truck is rocked about the axle 14 until the position shown in Figure 1 is attained. This construction makes it easier for the operator to pick up a load with the truck and in like manner and reverse fashion makes it easier to shift the truck from a tilted position to one in which a load is discharged.

A step brace 25 (Figure 1) is welded or otherwise secured to the base portion 16 of the cradle frame 12 opposite the back bone and at its lower end is welded or otherwise secured to the backbone adjacent the axle 14. This brace provides a step surface 25a for the ball of the operator's foot and a rounded part 25b to accommodate the arch of the operator's foot so that he can give both a downward and forward push to the lower part of the truck while pulling on the handle bar and tilting or "breaking" the load. This facilitates movement of the toes 22 under the lower chime of the barrel and also insures proper engagement of the barrel with the cradle or slat 20 during the "break" when loading or unloading the truck. The step brace 25 also affords a rest for the truck whether loaded or empty; the part 25b contacting the floor and supporting the truck when the handle is lowered a little from the position shown in Figure 1.

The backbone 10 is of improved construction to increase its strength as a beam, particularly in a plane normal to the axle 14. For this reason the cross sectional sectional shape of the backbone, as shown in Figure 3, comprises two tubes 27 of rectangular cross section mounted with complementary side faces in engagement and welded to each other providing a double central rib 28 to receive loads imparted by the self-locking chime mechanism as hereafter described and also to reinforce the backbone against bending. Four ribs are thus provided to receive loads in a plane normal to the floor wherewith lighter walled tubing has its strength developed to better advantage than has been obtainable in single tube constructions.

A tubular handle bar 30 is rigidly secured to the top end of the backbone 10. As shown in Figure 2 the handle bar is bowed as at 31 and preferably is displaced from the plane of the backbone as shown in Figure 1. The bowed portion is of sufficient depth and curvature to permit the operator to move his body forward partially into it as he manipulates the barrel truck while grasping two hand grips 33 at the ends of the bow. The axes of the grips are not coincident but each inclines toward the bowed portion 31 a substantial amount to permit the operator's hands to move easily about the grips as the truck is tilted. The operator preferably holds the grips 33 with his palms down when the backbone 10 is approximately vertical. Thereafter as he pulls the handle bar downwardly to the tilted position shown in Figure 1, at which time the handle 30 is in a substantially horizontal position, his hands may slide around the grips without any need of changing his "hold." The inclination of the grips 33 swings the aim of the operator's thumbs from a forwardly to a downwardly direction as the backbone 10 is pushed down and this facilitates his efforts in shifting the barrel truck and its load to the position shown in Figure 1. Features and advantages of the handle bar are disclosed and claimed in my copending application, Serial No. 635,322, filed December 15, 1945.

When the barrel truck is in the tilted position supported on the wheels 15 the container or barrel rests at one end on cross slat 20 and/or on the legs of the cradle 12, and at the other end on an arcuate barrel supporting saddle 35. The barrel is restrained against downward longitudinal displacement relative to the truck by bearing at the bottom and against the upper faces 36 of the toes 22. The spaced legs of the cradle 12 and the curved saddle 35 primarily restrain the barrel against rolling about its own axis while it is carried on the truck. Depending on the shape of the chime of the barrel or container, two forms of which are indicated by dot and dash lines 71 and 72 in Figure 4, the end 70 of the chime hook 45 cooperates with the saddle 35 to resist any rolling of the barrel about its own axis by imposing an upward force (Figure 4) upon the end 70 of the hook as the barrel tends to roll.

The chime hook mechanism and the barrel support form an integral assembly that is slidable as a unit up and down the backbone 10. The chime hook assembly is supported on the backbone by a pair of U-shaped brackets 38 and 39 welded to and extending transversely of a plate 40 extending lengthwise of the backbone. The bracket 39 is provided with two outturned ears 42 and 43 that support a plate 44 bolted thereto by bolts 47. The plate 44 and bracket 39 thus cooperate to provide a closed box like collar loosely encircling the backbone and retaining the chime hook assembly thereon as shown in Figures 3 and 4. The saddle 35 is welded to the plate 44 and is curved to receive the curved barrel wall near the top thereof.

To aid in retaining the chime hook assembly on the backbone and also to provide a lock for holding it in fixed position a self-locking chime hook 45 is pivotally mounted on arms 50 and 51 of the U-shaped bracket 38. This chime hook comprises two legs in the form of a lower bent member 53 and a upper hook member 55 each welded to a gusset plate 56 and a hollow spacer 57. The spacer in turn is rotatably carried on a bolt 59 capped by a nut 60 to support the hook and yet permit it to swing about the axis of the bolt 59 (Figure 3).

The members 53 and 55 are provided with rounded curved ends 61 and 62 that make contact with the backbone, and these members are so proportioned that when both the ends or feet 61 and 62 loosely and freely contact the backbone on the upper side, as viewed in Figures 1, 3 and 4, the plate 40 on the opposite side of the backbone will be freely spaced from it and will have enough clearance to permit free sliding movement of the chime hook assembly lengthwise of the backbone. As viewed in Figures 3 and 4 it will be seen that I prefer that the members 53 and 55 along with their curved ends 61 and 62 be somewhat narrower than the backbone but disposed centrally thereof so that the bearing contact between it and the ends 61 and 62 will be aligned with and largely concentrated upon the double internal walls 28 of the backbone.

The extreme end 70 of the member 55, comprising the so-called "hook" part of the chime hook as a whole, preferably lies substantially parallel with the backbone and is preferably straight and square ended, see Figures 1, 2 and 4. The extreme end 70 of the chime hook is spaced far enough away from the backbone and far enough above the load bearing surface of the saddle 35, as viewed in Figure 4, to permit the end 70 to contact the top of different sized drums or barrels inwardly of the chime when the truck and chime hook are addressed to a barrel or drum that is to be loaded. In Figure 4 the overlapping dashed line 71 and dotted line 72 suggest in outline a range of forms of chimes with respect to which my chime hook effects satisfactory engagement.

To restrain the chime hook assembly from undesirable free sliding movement along the backbone under the influence of gravity a light resilient frictional engagement between the plate 45 and the curved ends 61 and 62 of the members 53 is effected by the action of a coil spring 64 acting upon a plunger 65 which slidably engages the opposite side of the backbone. The spring 64 is seated within a recess of a sleeve 66 secured to the plate 40, which sleeve is also adapted to act as a hand grip by which the chime hook assembly may be moved along the backbone. From the description of the chime hook assembly thus far it will be seen that normally the pressure of the spring 64 will by friction yieldably hold the assembly and its parts in the position shown in Figures 3 and 4 to retain it yieldably in any adjusted position on the backbone.

When, however, pressure is applied to the end 70 of the chime hook in a direction substantially parallel with the backbone the whole chime hook assembly will tend to slide upwardly of the backbone, to the right as viewed in Figure 4, although this sliding movement will be resisted somewhat by the effect of the clockwise turning movement of the chime hook 45 about the axis of the pin 59 to increase the frictional pressure between the end 62 and the adjacent face of the backbone. It will be observed that the moment of such a force about the axis of the pin 59 is relatively small since the end 70 of the hook is not displaced very much farther away from the backbone than the axis of the pin 59. When, however, a force is applied to the end 70 of the chime hook in a direction transverse to the backbone and upwardly as viewed in Figure 4, the moment about the axis of the pin 59 is very much greater so that the pressure exerted by the end 62 against the backbone is very much increased thus tending to cause the whole chime hook assembly to become locked with respect to the backbone and highly resistant to movement with respect thereto.

This locking action takes place when the truck is addressed to a barrel or drum and the operator begins to tip the barrel after having engaged the end 70 of the chime hook inwardly of the barrel chime as indicated in Figure 4. Particularly where the barrel chime presents a curved or sloping surface, as indicated by the dotted line 72, it is important that the chime hook be prevented from sliding upwardly of the backbone at this time for otherwise the grasp upon the chime would be lost and the barrel would become disengaged from the truck with hazardous results to the operator and with failure to pick up the load. A force applied to the end 70 of the chime hook tending to cause it to rotate counterclockwise about the pin 51 produces a similar locking effect by virtue of its pressing the end 61 of the member 53 into tight engagement with the backbone. Similarly if the chime should stand high enough to contact the member 53 directly such a contact would also tend to lock or freeze the chime hook assembly substantially immovably with respect to the backbone.

Thus when the load is first broken, i. e., when the barrel or drum is first tipped from its position of rest on the floor toward its position of carriage on the truck the chime hook very firmly resists sliding movement along the backbone, but this resistance to movement decreases as the effort required of the operator in tipping the drum decreases and the center of gravity of the drum approaches the vertical line of the point of contact of the lower chime of the barrel with the floor. When the center of gravity of the drum passes this vertical line in the direction toward the operator the chime hook is thereupon freed from its frictional engagement with the backbone except for the light resistance induced by the spring 64. The chime hook is thus free to slide upwardly as the top of the drum tends to "climb" up the backbone as an incident to the skidding movement of the lower chime of the barrel along the upper surfaces 36 of the toes 22 upon the assumption of the load by the truck and the lifting of the bottom end of the barrel away from contact with the floor.

When the barrel or drum is unloaded the operations and their effects do not follow in exactly the same order but the advantages of my chime hook persist. During unloading it is often desirable that the chime hook have a firm grip on the chime after the center of gravity of the load has passed over the axle of the truck so that the drum will not escape or lurch away from the truck. During unloading part of the lower chime of the barrel will tend to rest in its upward position on the upper surfaces of the toes 22 until the truck is permitted to reach a substantially vertical position with the far side of the lower chime contacting the floor. Thereafter a further push on the handle bar pushes the toes outwardly from beneath the lower chime while the barrel is itself tipped on the far edge of the chime by the operator's push. Immediately the chime hook is freed from transverse loads it may slide along the backbone to make possible relative movement between the backbone and the load. Thereafter the operator may lift or move the chime hook assembly by grasping the sleeve 66 as occasion requires.

While I have illustrated and described a preferred form of my invention, changes, modifications and improvement therein will occur to those skilled in the art, and I do not intend to be limited in the scope of my patent to the particular form of my invention herein illustrated and described nor in any manner other than by the claims appended hereto.

I claim:

1. A load handling mechanism including a frame adapted to engage a load in one position and support the load in a second position by tilting said load about a point on its surface to shift the load center of gravity from one side of said point to the other, said frame comprising a backbone, a bracket slidably mounted on said backbone to support one end of said load, a hook shiftably mounted on said bracket to engage said load and a lock including a member associated with said hook releasably engaging said backbone, said member being shiftable in response to the shifting of said hook relative to said backbone from an unlocked position of light engagement with said backbone to a locked position of tight non-sliding engagement therewith by application of force to said hook transversely of said backbone whereby to lock said bracket and backbone together.

2. A load handling mechanism including a frame adapted to engage a load in one position and support the load in a second position by tilting said load about a point on its surface to shift the load center of gravity from one side of said point to the other, said frame comprising a backbone, a bracket slidably mounted on said backbone to support one end of said load, a hook shiftably mounted on said bracket to engage said load and a lock including a member associated with said hook releasably engaging said backbone, said member being shiftable in response to the shifting of said hook relative to said backbone from an unlocked position of light engagement with said backbone to a locked position of tight non-sliding engagement therewith by application of force to said hook transversely of said backbone whereby to lock said bracket and backbone together, said hook and lock being so proportioned that when force is applied to said hook generally parallel to said backbone it does not substantially resist sliding movement of said bracket along said backbone.

3. A barrel truck comprising a frame including an axle, wheels rotatably mounted on said axle, a backbone secured to said axle and forming part of said frame, a handle bar on said backbone, toe members carried by said frame and adapted to extend under a barrel, barrel chime engaging means carried by said backbone including a bracket slidable along said backbone, a chime hook pivotally carried by said bracket and having a leg loosely engaging said backbone and adapted to move toward said backbone in response to a force tending to rock said hook outwardly from said backbone whereby said leg will jam-lock against said backbone to prevent said bracket from sliding along said backbone.

4. A barrel truck comprising an axle, wheels mounted on said axle, a backbone secured to said axle, a U-shaped cradle secured to said axle with the base of said cradle secured to said backbone, a toe member at the end of each arm of said cradle and adapted to extend under a barrel, barrel chime engaging means carried by said backbone including a bracket slidable along said backbone, a chime hook pivotally carried by said bracket and having a leg loosely engaging said backbone and adapted to move toward said backbone in response to a force tending to rock said hook outwardly from said backbone whereby said leg will jam-lock against said backbone to prevent said bracket from sliding along said backbone.

5. A barrel truck comprising an axle, wheels mounted on said axle, a backbone secured to said axle, a handle bar secured to said backbone, a U-shaped cradle secured to said axle with the base of said cradle secured to said backbone, a toe member at the end of each arm of said cradle and adapted to extend under a barrel, barrel chime engaging means carried by said backbone including a bracket slidable along said backbone, a chime hook pivotally carried by said bracket with two spaced legs adapted to engage said backbone, said hook and each of said legs having such relation to each other that a force tending to move said hook transversely of said backbone will jam-lock one of said legs against said backbone to prevent said bracket from sliding along said backbone.

6. A barrel truck comprising an axle, wheels mounted on said axle, a backbone secured to said axle, a handle bar secured to said backbone, a U-shaped cradle secured to said axle with the base of said cradle secured to said backbone, a toe member at the end of each arm of said cradle and adapted to extend under a barrel, barrel chime engaging means carried by said backbone including a bracket slidable along said backbone, resilient means normally urging complementary parts of said backbone and bracket toward each other to hold said bracket in adjusted position on said backbone, a chime hook pivotally carried by said bracket with two spaced legs adapted to engage said backbone, said hook and each of said legs having such relation to each other that a force tending to move said hook transversely of said backbone will jam-lock one of said legs against said backbone to prevent said bracket from sliding along said backbone.

7. A barrel truck comprising an axle, wheels rotatably mounted on said axle, a backbone secured to said axle, a handle bar on the upper end of said backbone, a U-shaped cradle secured to said axle with the base of said cradle passing beneath and secured to said backbone, a toe member at the end of each arm of said cradle and adapted to extend under a barrel, a roller carried by each arm adjacent a respective toe member, barrel chime engaging means carried by said backbone including a bracket slidable along said backbone, resilient means normally urging complementary parts of said backbone and bracket toward each other to hold said bracket in adjusted position on said backbone, a chime hook pivotally carried by said bracket with two spaced legs adapted to engage said backbone, said hook and each of said legs having such relation to each other that a force tending to move said hook transversely of said backbone will jam-lock one of said legs against said backbone to prevent said bracket from sliding along said backbone and an arcuate barrel support carried by said bracket to support a barrel adjacent said chime hook.

8. A frame for a hand truck or the like including an axle, wheels rotatably mounted at the ends of said axle, a U-shaped cradle secured by its arms to said axle to position said arms transversely of said axle, a backbone member secured at one end to said axle and extending across and above the base of said cradle, said axle backbone and cradle all being rigidly secured together.

9. A frame for a hand truck or the like including an axle, wheels rotatably mounted at the ends of said axle, a U-shaped cradle secured by its arms to said axle to position said arms transversely of said axle, a backbone member secured at one end to said axle and extending across and above the base of said cradle, means to secure said backbone and said cradle together, said backbone comprising a hollow box shaped structural member with a central reinforcing rib extending substantially normal of said axle from one to the opposite side of said backbone to reinforce the same against bending in a plane transversely of said axle.

10. A frame for a hand truck or the like including an axle, wheels rotatably mounted at the ends of said axle, a U-shaped cradle secured by its arms to said axle to position said arms transversely of said axle, a backbone member secured at one end to said axle and extending across and above the base of said cradle, means to secure said backbone and said cradle together, said backbone comprising a hollow box shaped structural member with a central reinforcing rib extending substantially normal of said axle from one to the opposite side of said backbone to reinforce the same against bending in a plane transversely of said axle, and a brace member adapted to cooperate with said wheels to support said frame above a floor and secured to said frame adjacent the connections between said backbone and cradle and said backbone and axle respectively.

11. A frame for a hand truck or the like including an axle, wheels rotatably mounted at the ends of said axle, a backbone member secured at one end to said axle, said backbone comprising a hollow box shaped structural member with a central reinforcing rib extending substantially normal of said axle from one to the opposite side of said backbone to reinforce the same against bending in a plane transversely of said axle, a bracket slidable along said backbone, resilient means normally urging complementary parts of said backbone and bracket toward each other to hold said bracket in adjusted position on said backbone, a chime hook pivotally carried by said bracket with two spaced legs adapted to engage said backbone in the region of said rib, said hook and each of said legs having such relation to each other that a force tending to move said hook transversely of said backbone will jam-lock one of said legs against said backbone to prevent said bracket from sliding along said backbone.

12. A frame for a hand truck or the like including an axle, wheels rotatably mounted at the ends of said axle, a U-shaped cradle secured by its arms to said axle to position said arms transversely of said axle, a backbone member secured at one end to said axle and extending across and above the base of said cradle, means to secure said backbone and said cradle together, said backbone comprising a hollow box shaped structural member with a central reinforcing rib extending substantially normal of said axle from one to the opposite side of said backbone to reinforce the same against bending in a plane transversely of said axle, a bracket slidable along said backbone, resilient means normally urging complementary parts of said backbone and bracket toward each other to hold said bracket in adjusted position on said backbone, a chime hook pivotally carried by said bracket with two spaced legs adapted to engage said backbone in the region of said rib, said hook and each of said legs having such relation to each other that a force tending to move said hook transversely of said backbone will jam-lock one of said legs against said backbone to prevent said bracket from sliding along said backbone, and a brace member adapted to cooperate with said wheels to support said frame above a floor and secured to said frame adjacent the connections between said backbone and cradle and said backbone and axle respectively.

13. A frame for a hand truck or the like including an axle, wheels rotatably mounted at the ends of said axle, a U-shaped cradle secured by its arms to said axle to position said arms transversely of said axle, a backbone member secured at one end to said axle and extending across and above the base of said cradle, means to secure said backbone and said cradle together, said backbone comprising a hollow box shaped structural member with a central reinforcing rib extending substantially normal of said axle from one to the opposite side of said backbone to reinforce the same against bending in a plane transversely of said axle, a bracket slidable along said backbone, resilient means normally urging complementary parts of said backbone and bracket toward each other to hold said bracket in adjusted position on said backbone, a chime hook pivotally carried by said bracket with two spaced legs adapted to engage said backbone in the region of said rib, said hook and each of said legs having such relation to each other that a force tending to move said hook transversely of said backbone will jam-lock one of said legs against said backbone to prevent said bracket from sliding along said backbone, a wheel rotatably carried by each of said cradle arms on fixed axes parallel to said axle to provide a four wheel rolling support for said frame, and a reinforcing slat member secured to each arm adjacent said arm carried wheels.

WILLIAM C. ROE.

REFERENCES CITED

The following references are of record in the file of this patent:

UNITED STATES PATENTS

| Number | Name | Date |
| --- | --- | --- |
| 1,059,595 | Clark | Apr. 22, 1913 |
| 1,380,073 | More | May 11, 1921 |
| 1,615,919 | Sheldon | Feb. 1, 1927 |
| 2,014,057 | Rogers | Sept. 10, 1935 |
| 2,044,363 | Morse et al. | June 16, 1936 |
| 2,346,649 | Bilek et al. | Apr. 18, 1944 |
| 2,385,514 | Hawkins | Sept. 25, 1945 |